United States Patent Office 3,543,155
Patented Nov. 24, 1970

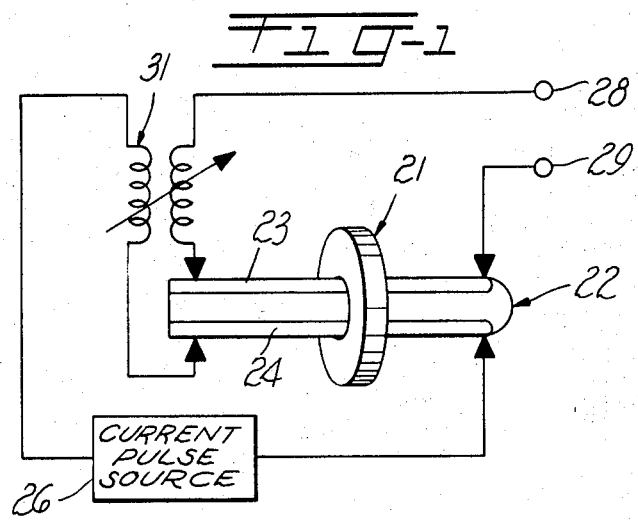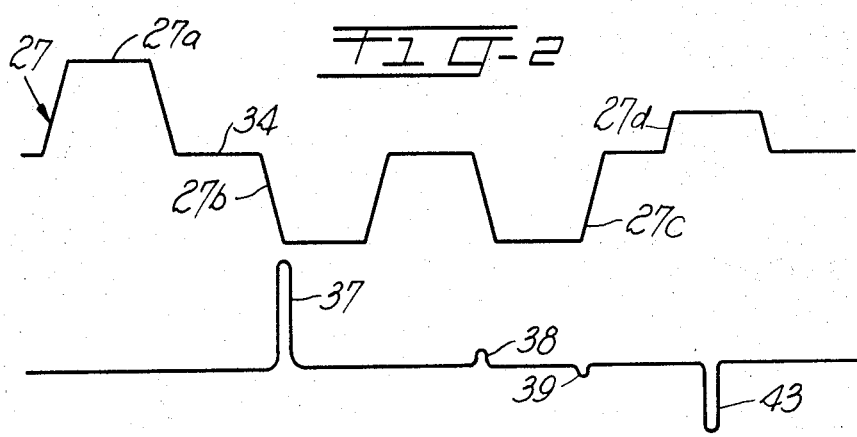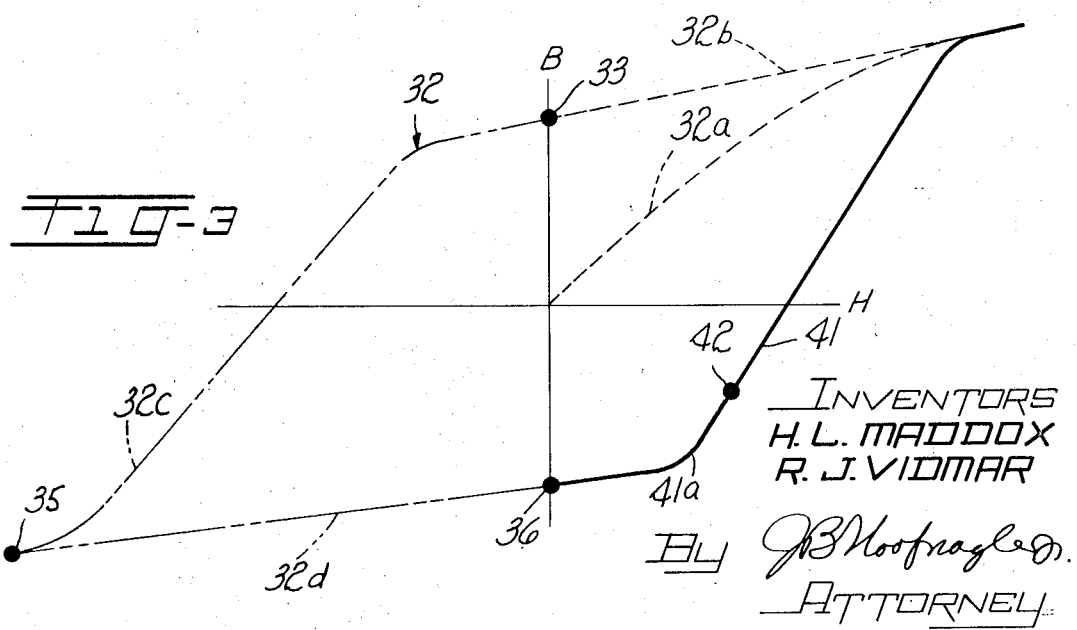

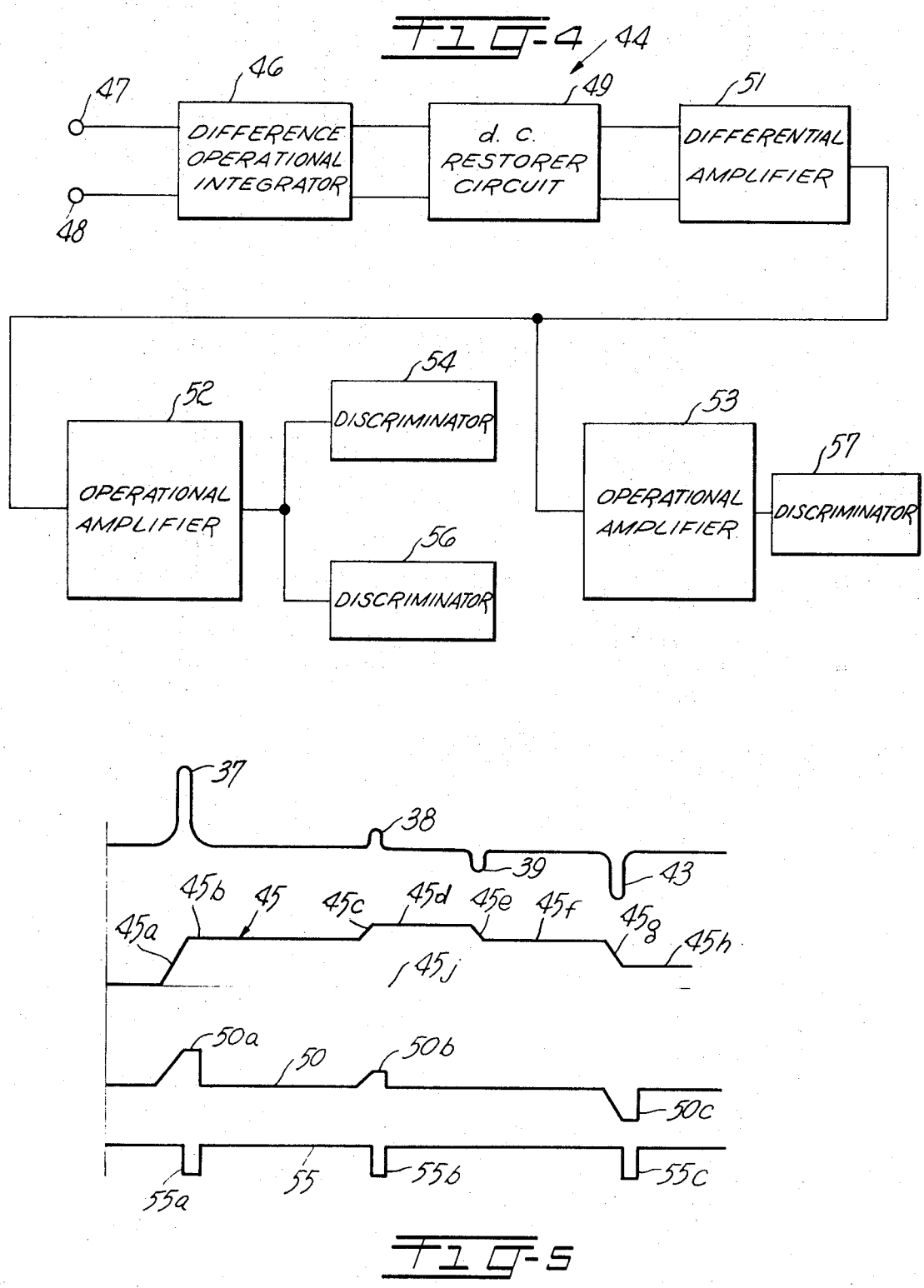

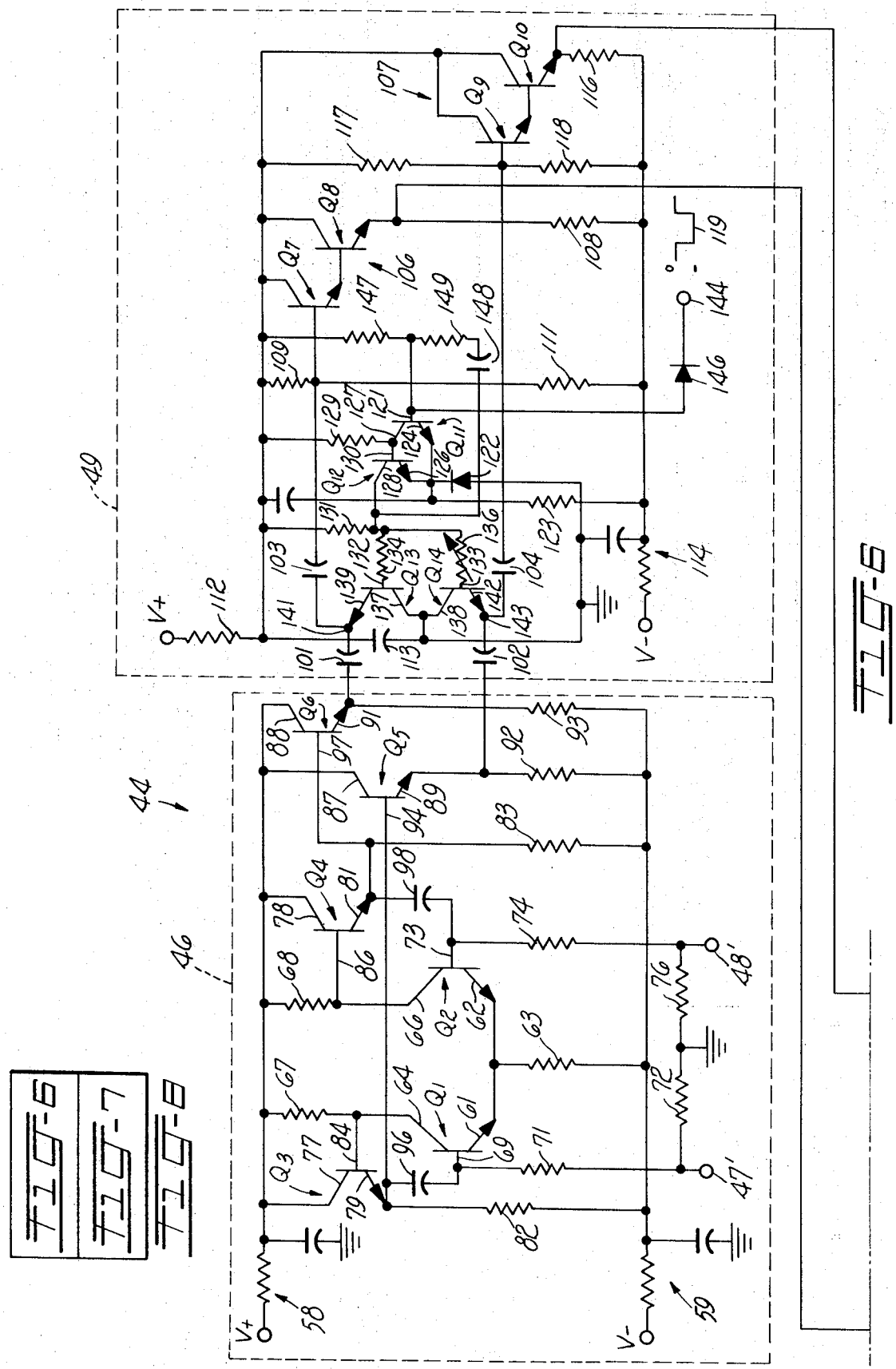

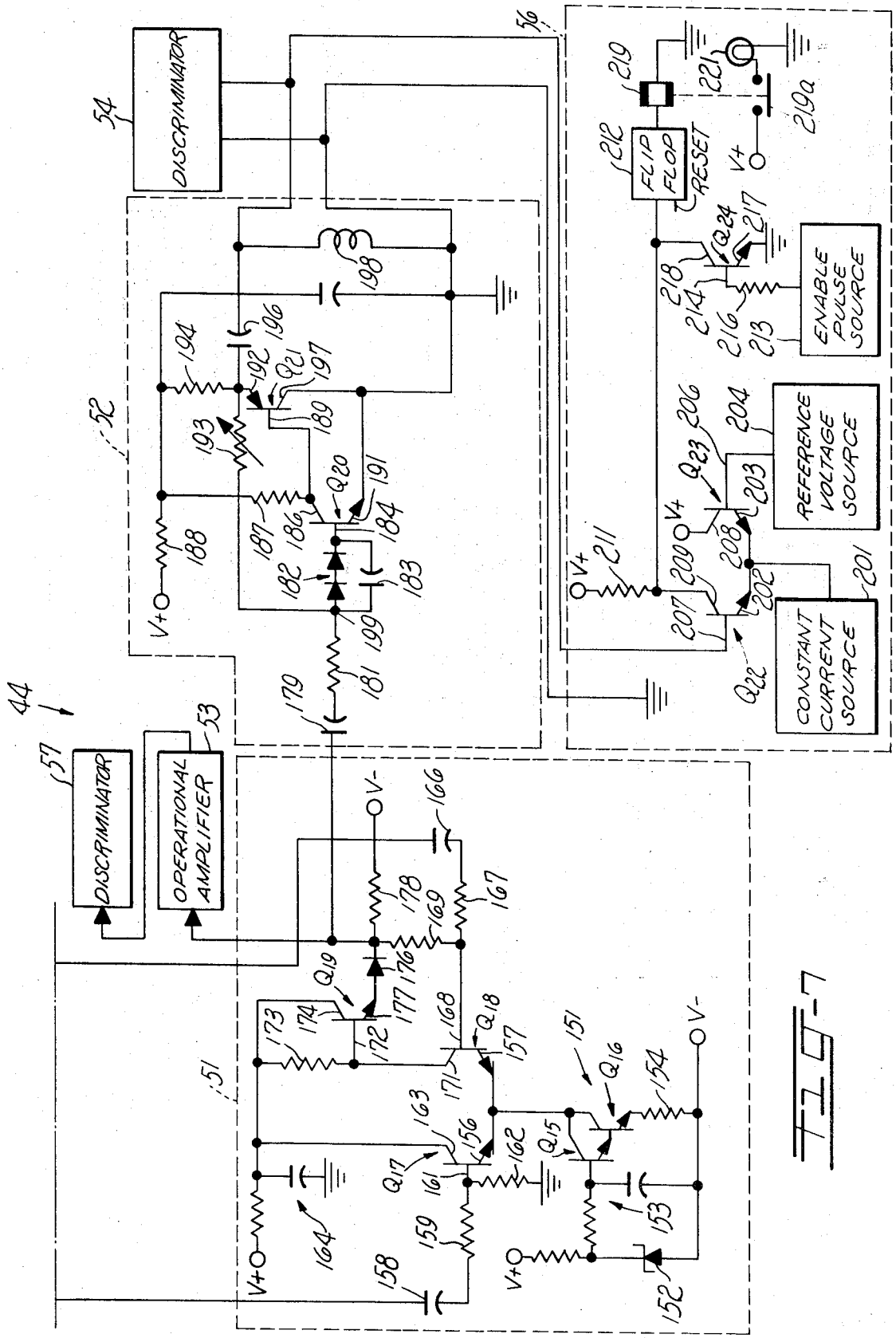

1

3,543,155
SYSTEMS FOR INTEGRATING A SIGNAL AND SELECTIVELY MEASURING THE AMPLITUDE OF THE INTEGRATED SIGNAL
Harry L. Maddox, Columbus, and Richard J. Vidmar, Whitehall, Ohio, assignors to Western Electric Company, Incorporated, New York, N.Y., a corporation of New York
Filed Apr. 23, 1968, Ser. No. 723,536
Int. Cl. G01r 1/00
U.S. Cl. 324—111                                         4 Claims

ABSTRACT OF THE DISCLOSURE

Signals of low amplitude and short duration are developed by pulsing a ferrite core for the purpose of testing the characteristics of the core. In view of the low amplitude and short duration of the signals, the signals are integrated and amplified for testing purposes. Initially, the signals are fed into a differential operational integrating amplifier and integrated so that the area of the signals being measured can be analyzed without interference from noise and common mode signals. The integrated signals are then fed to a D.C. restorer circuit which provides a common D.C. reference level for each differentially integrated signal. The output of the D.C. restorer circuit is then coupled to a plurality of operational amplifiers which respond selectively to various signals being measured and control discriminators for indicating the acceptance or rejection of the signals being measured and, consequently, the ferrite core which produced the signals.

BACKGROUND OF THE INVENTION

Field of the invention

This invention relates to systems for measuring signals and particularly relates to systems for measuring signals of low amplitude and short duration using a D.C.-restored, differential-operational integrator.

Description of the prior art

In the testing of various types of electronic equipment such as ferrite cores, the equipment is operated in a normal manner to produce output signals which are subsequently measured to determine whether the equipment is operating properly. Frequently, the output signals developed by the electronic equipment are of such a low amplitude and short duration that it is difficult to detect and measure the signals accurately. In addition, where signals of low amplitude are to be measured, it is important that noise and common mode signals be excluded from circuits used in the testing facilities.

If signals of different amplitudes and durations are to be measured, an amplifier would normally be required for each signal of low amplitude and short duration so that the magnitude of the signal to be measured would be sufficiently large to facilitate the detection and accurate measuring thereof. In addition, each signal of low amplitude and short duration to be measured would require a separate channel of conventional circuits for measuring the individually amplified signals.

SUMMARY OF THE INVENTION

It is, therefore, an object of this invention to provide new and improved systems for measuring signals.

Another object of this invention is to provide new and improved systems for measuring low amplitude signals of short duration by integrating the signals and thereafter controlling discriminators in response to the integrated signals for indicating the acceptance of the measured signals.

Still another object of this invention is to provide new and improved systems for measuring low amplitude signals by integrating differentially signals to be measured to thereby reject noise and common mode signals which may be occurring during the occurrence of the signals to be measured.

A further object of this invention is to provide new and improved systems for measuring signals of low amplitude and short duration by integrating commonly various signals to be measured and thereafter using a single channel of signal level restoration for developing controlling outputs in response to the differentially integrated signals which are applied to individual discriminators to indicate the acceptance of the different signals being measured.

A system for measuring a signal in accordance with the principles of the invention may include a differential operational integrator for integrating differentially signals of low amplitude and of short duration. A D.C. restorer circuit establishes a common D.C. reference level for each of the integrated signals so that all of the differential signals can be measured with respect to a common reference level. The integrated restored signals are then coupled to associated discriminators for indicating acceptance of the amplitude and duration of the signals being measured.

BRIEF DESCRIPTION OF THE DRAWING

Other objects and advantages of the present invention will be apparent from the following detailed description when considered in conjunction with the accompanying drawings in which:

FIG. 1 is a schematic diagram of a circuit for applying current pulses to a ferrite core and for detecting output signals developed by the pulsed ferrite core;

FIG. 2 is a wave-form diagram showing the relationship between current pulses for pulsing the ferrite core of FIG. 1 and the signals produced by the pulsed ferrite core;

FIG. 3 is a diagram of a hysteresis loop representing desirable characteristics of the ferrite core of FIG. 1;

FIG. 4 is a block diagram showing a system for measuring the amplitude of the output signals of the pulsed ferrite core of FIG. 1 in accordance with the principles of the invention;

FIG. 5 is a wave-form diagram showing the relationship of various wave forms developed in the operation of the system of FIG. 4;

FIGS. 6 and 7 are schematic diagrams disclosing the circuit configuration of the system of FIG. 4 for measuring signals in accordance with the principles of the invention, and FIG. 8 is a view of an arrangement of FIGS. 6 and 7 to show a complete circuit configuration of the system of FIG. 4.

DETAILED DESCRIPTION

Referring now to FIG. 1, a ferrite core, designated generally by numeral 21, is positioned onto a probe, designated generally by the numeral 22. The probe 22 is provided with a pair of spaced conductive members 23 and 24 which extend longitudinally on opposite sides of the probe. A current pulse source 26 is connected to opposite ends of the conductive element 24 of the probe 22 and provides a pulse train, designated generally by the numeral 27 (FIG. 2), for altering selectively the state of the ferrite core 21. A pair of output terminals 28 and 29 are connected to associated opposite ends of the conductive element 23 of the probe 22 for providing a means for observing pulses developed by the ferrite core 21 when the state of the core is altered selectively.

Since the conductive elements 23 and 24 of the probe 22 are insulated and spaced from each other, an undesirable stray coupling between the elements causes a transformer action to occur when the ferrite core 21 is pulsed by the current pulse train 27 (FIG. 2) from the current source 26. To eliminate signals which result from the undesirable stray coupling between the conductive elements 23 and 24 of the probe 22, a variable bucking coil, designated generally by the numeral 31, is connected in the circuit of the current pulse source 26 and the output terminals 28 and 29.

Referring to FIGS. 1, 2 and 3, the current pulse source 26 provides the current pulse train 27 which passes through the conductive element 24 of the probe 22 to alter selectively the state of the ferrite core 21. Initially, a positive pulse 27a of the current pulse train 27 drives the ferrite core 21 from an unknown state to a known state, for example along dashed lines 32a and 32b to a point 33 on a B ordinate of a hysteresis loop, designated generally by the numeral 32, which represents magnetic characteristics of the ferrite core. When the pulse 27a returns to a normal reference level 34 of the current pulse train 27, the state of the ferrite core 21 at that time is represented by the point 33 on the B ordinate of the hysteresis loop 32.

Subsequently, a negative current pulse 27b is applied to the conductive element 24 of the probe 22 to switch the state of the ferrite core 21 which is represented by a dashed line 32c of the hysteresis loop 32, a point 35, a dashed line 32d and the point 36 on the B ordinate. Thus when the current pulse 27b switches the ferrite core 21, the magnetic characteristics of the core follow a pattern along the dashed lines 32c and 32d to switch the state of the core from the point 33 to the point 36 of the hysteresis loop 32. When the core 21 switches states, a "switch" signal 37 (FIG. 2) is developed, the amplitude and time duration of which is representative of the switching characteristics of the ferrite core 21. It is noted that the "switch" signal 37 is of relatively high amplitude and short duration, for example, 1500 millivolt-microseconds, when compared with other signals developed by pulsing the ferrite core 21.

Subsequently, the negative current pulse 27b terminates and another negative-going pulse 27c is developed by the current pulse source 26 and passes through the conductive element 24 of the probe 22. During the period of the current pulse 27c, the state of the ferrite core 21 is altered to the extent that the magnetic characteristics of the core follow the dashed line 32d from the point 36 to the point 35 of the hysteresis loop 32. During the period when the pulse 27c is going from the reference level 35 to a steady state negative value, a "shuttle" signal 38 (FIG. 2) is developed where the amplitude and duration of the developed "shuttle" signal are indicative of the slope of the dashed line 32d. It is noted that the amplitude and duration of the "shuttle" signal 38 are extremely small in the order of five millivolt-microseconds. The slope of the line 32d is indicative of the ability of the ferrite core 21 to retain a major portion of the magnetic flux within the core when the state of the core is at the point 35 on the hysteresis loop. Therefore, ideally the line 32d of the hysteresis loop 32 would be horizontal. Thus, the amplitude and duration of the "shuttle" signal 38 provides an indication of the acceptability of the property of the magnetic core with respect to the slope of the line 32d of the hysteresis loop 32.

During the period when the negative current pulse 27c is going from a steady negative value to the reference level 34, the state of the ferrite core 21 is altered to return the core to the point 36 on the B ordinate of the hysteresis loop 32 (FIG. 3). At this time, another signal 39, which is negative going, is developed and alters the state of the ferrite core 21 whereby the core returns to a state indicated by the point 36 of the hysteresis loop 32. The developed negative signal 37 is of no value in the testing of the ferrite core 21.

Subsequently, a positive current pulse 27d is developed by the current pulse source 26 which would normally switch the state of the core from the point 36 to the point 33 of the hysteresis loop 32 and would normally follow a path indicated by a solid line 41 and the upper dashed line 32b to the point 33 of the hysteresis loop 32. However, it is noted that the amplitude of the current pulse 27d is normally not sufficient to fully switch the state of the ferrite core 21 and only alters the state of the core to the extent that the state approaches a knee 41a in the solid line 41 of the hysteresis loop 32.

When the positive current pulse 27d is terminated, the state of the ferrite core 21 tends to return to the point 36 on the B ordinate of the hysteresis loop 32.

During the period of the positive current pulse 27d, a "coercive" signal 43 (FIG. 2) is developed, the amplitude and pulse duration of which indicate whether the ferrite core 21 has sufficient characteristics to insure that the core will not switch states, for example, from the state as indicated by the point 36 to the state as indicated by the point 33 of the hysteresis loop 32, at a current value less than a specified value. It is significant that the state of the ferrite core 21 not be altered by the positive current pulse 27d to the extent that the state of the core passes the knee 41a of the solid line 41 as, for example, to a point 42.

During the application of the various current pulses 27a through 27d, as developed by the current pulse source 26 and flowing through the conductive element 24 of the probe 22, the "switch," "shuttle" and "coercive" signals 37, 38 and 43, respectively, appear in the conductive element 23 of the probe 22 and are coupled to the terminals 28 and 29 for subsequent measurement thereof as an indication of the acceptability of the ferrite core 21 being tested.

Referring now to FIG. 4, a system, designated generally by the numeral 44, for measuring signals over a large range of extremely low amplitudes and short durations includes a differential operational integrator 46 which is provided with input terminals 47 and 48 for receiving the signals to be measured. The input terminals 47 and 48 are normally connected to the output terminals 28 and 29 (FIG. 1), respectively, for coupling to the system 44 the "switch," "shuttle" and "coercive" signals 37, 38 and 43, respectively, developed when the ferrite core 21 (FIG. 1) is pulsed. The differential integrator 46 develops an integrated output, designated generally by the numeral 45 (FIG. 5), when signals are applied to the input terminals 47 and 48.

When the "switch" signal 37 (FIG. 5) is applied to the differential integrator 46, the integrated output 45 rises substantially linearly from a base level 45j along a slope 45a to a steady level 45b where the amplitude of the steady level 45b represents the integral of the "switch" signal. Subsequently, the "shuttle" signal 38 (FIG. 5) is fed to the differential integrator 46 and the integrated output 45 (FIG. 5) rises substantially linearly along a slope 45c to a higher steady level 45d. However, the amplitude which represents the integral of the "shuttle" signal 38 is the difference between the values of the steady levels 45b and 45d rather than the absolute value of the amplitude of the level 45d with respect to the base level 45j. Thus, the output 45 of the integrator 46 is accumulative and the accumulative effect must be taken into consideration when several integrated signals are subsequently measured in the testing of the ferrite core 21.

The negative pulse 39 is then fed to the integrator 46 and the integrated output 45 (FIG. 5) of the integrator decreases linearly along a slope 45e to a steady level 45f. The "coercive" signal 43 is fed to the integrator whereby the integrated output 45 decreases linearly along a slope 45g to a steady level 45h. The signal amplitude which represents the integral of the "coercive" signal 43 is equal to the difference between the value of the steady levels 45f and 45h.

The differentially integrated output 45 (FIG. 5) of the integrator 46 is coupled differently to a D.C. restorer circuit 49 for establishing an accurate and stable D.C. reference level 50 for pulses 50a, 50b and 50c which represent the integrals of the signals 37, 38 and 43, respectively.

The output signals 50a, 50b and 50c of the D.C. restorer circuit 49 are coupled singly differentially to a differential amplifier 51 which is designed for high common mode rejection. The individual differential signals are amplified by the differential amplifier 51 and a single output signal, for each differential signal applied to the amplifier, is developed and is coupled to a pair of operational amplifiers 52 and 53.

The amplifier 52 is designed to respond to the integrated signals 50a and 50c (FIG. 5) which are the integrals of the "switch" and "coercive" signals 37 and 43, respectively, and provide a unit gain and ground reference level in coupling the signals to associated discriminators 54 and 56, respectively. The discriminators 54 and 56 then respond to the original condition of the "switch" and "coercive" signals 37 and 43, respectively, to provide an indication of the acceptability of the signals and, consequently, the acceptability of the ferrite core 21 (FIG. 1) with respect to switching and coercive characteristics.

The amplifier 53 is designed to respond to the integrated signal 50b (FIG. 5) resulting from the "shuttle" signal 38 and amplifies substantially the resultant integrated signal 50b which is coupled to a discriminator 57. The discriminator 57 responds to the amplified signal which results from the application of the "shuttle" signal 38 to the system 44 and provides an indication of the acceptability of the "shuttle" signal and, consequently, the acceptability of the ferrite core 21 (FIG. 1) with respect to the characteristic of the core as defined by the slope of the hysteresis loop 32 along line 32d.

Referring to FIG. 5, a series of enabling pulses 55a, 55b and 55c are applied within the discriminators 54, 57 and 56, respectively, and occur during periods when the integrated, D.C.-restored, amplified signals 50a, 50b and 50c, respectively, are applied to the associated discriminators to enable amplitude measuring facilities to determine whether the amplitude of the signals 50a, 50b and 50c are acceptable.

Referring now to FIG. 6, the differential operational integrator 46, which includes a differential operational integrating amplifier, includes six NPN type transistors, designated generally by the expression Q1 through Q6. The integrator 46, and the remainder of the system 44, receives operating power from a positive power source V+ and a negative power source V−. The positive power source V+ and the negative power source V− are connected to associated filters, designated generally by the reference numerals 58 and 59, respectively, to prevent noise signals, which may be appearing in the power sources, from affecting the operation of the integrators 46.

During the quiescent state, emitters 61 and 62 of the transistors Q1 and Q2 are connected to the negative power source V− through the filter 59 and a resistor 63. Collectors 64 and 66 of the transistors Q1 and Q2, respectively, are connected to the positive power source V+ through the filter 58 and associated, individual resistors 67 and 68, respectively. The base 69 of the transistor Q1 is connected to ground through resistors 71 and 72 while the base 73 of the transistor Q2 is connected to ground through resistors 74 and 76.

The integrator 46 also includes a pair of transistors Q3 and Q4 which form emitter-follower circuits. Collectors 77 and 78 of the transistors Q3 and Q4, respectively, are each connected to the positive power source V+ through the filter 58. Emitters 79 and 81 of the transistors Q3 and Q4, respectively, are connected to the negative power source V− through the filter 59 and associated resistors 82 and 83, respectively. A base 84 of the transistor Q3 is connected to the collector 64 of the transistor Q1 and the base 86 of the transistor Q4 is connected to the collector 66 of the transistor Q2.

Another pair of transistors Q5 and Q6 form emitter-follower circuits which provide a buffer between the integrator 46 and the D.C. restorer circuit 49. Collectors 87 and 88 of the transistors Q5 and Q6 are connected to the positive power source V+ through the filter 58. Emitters 89 and 91 of the transistors Q5 and Q6 are connected to the negative power source V− through the filter 59 and associated resistors 92 and 93, respectively. The emitter 79 of the transistor Q3 is connected to a base 94 of the transistor Q5 and also to one side of a capacitor 96. The other side of the capacitor is connected to the base 69 of the transistor Q1. The emitter 81 of the transistor Q4 is connected to a base 97 of the transistor Q6 and also to one side of a capacitor 98. The other side of the capacitor 98 is connected to the base 73 of the transistor Q2.

When the negative power source V− is connected as shown in FIG. 6 and the bases of 69 and 73 of the transistors Q1 and Q2, respectively, are at ground, the transistors will conduct thereby drawing current from the negative power source V−, through the resistor 63, through the emitter-collector circuits of the transistors, through the collector resistors 67 and 68 and the positive power source V+. It is noted that the current passing through the resistor 63 will divide equally and pass through the emitter-collector circuits of the transistors Q1 and Q2. The current flow through the resistors 67 and 68 facilitates the establishing of a positive potential bias on the bases 84 and 86, respectively, of the transistors Q3 and Q4, respectively, which cause the transistors to conduct. When the transistors Q3 and Q4 conduct, the capacitors 96 and 98 will charge to predetermined levels, depending upon circuit parameters and bias levels, to establish a substantially zero potential level difference between the bases 69 and 73 of the transistors Q1 and Q2.

The "switch," "shuttle" and "coercive" signals 37, 38 and 43 (FIGS. 2 and 5) are applied to the integrator circuit 46 at terminals 47′ and 48′ which provide an input impedance characterized by the series combination of the resistors 72 and 76 being in parallel with the series combination of resistors 71 and 74.

The input signals 37, 38 and 43 (FIGS. 2 and 5) to be measured are applied differentially to the integrator 46 and are of equal and opposite polarity at the input terminals 47′ and 48′ and are, therefore, independent of the ground appearing between the resistors 72 and 76 which appears as a null. However, any noise and common mode signals which appear at the input terminals 47′ and 48′ will be in phase and will not be amplified or integrated because of common mode rejection. Therefore, only the signals to be measured will affect the operation of the integrator 46.

Assuming that the "switch" signal 37 (FIGS. 2 and 5) is applied to the integrator 46 so that the terminal 47′ is a negative potential and the terminal 48′ is a positive potential, the negative potential is coupled through the resistor 71 and creates a condition where the base 69 of the transistor Q1 attempts to go to some negative potential with respect to the potential at the base 73 of the transistor Q2. However, this attempt is sensed by the transistor Q1 and less of the current flowing through the resistor 63 is passed through the emitter-collector circuit of the transistor. Additionally, the transistor Q2 senses the change in operation of the transistor Q1 and tends to increase in conduction.

Consequently, the transistor Q3 conducts more due to an increase in the positive bias potential appearing on the base 84 of the transistor when the conduction of the transistor Q1 is lowered. When the transistor Q3 conducts additionally, current flows from the positive power source V+, through the filter 58 and the collector-emitter circuit of the transistor and charges additionally the capacitor 96 in a positive direction through the resistor 71 and the negative potential appearing at the terminal 47' and at a rate proportional to the current level supplied through resistor 71 to maintain the base 69 of the transistor Q1 at a substantially zero potential level.

When the capacitor 96 is charging toward a positive potential, the potential at the base 94 of the transistor Q5 is more positive which causes the conduction level of the transistor to increase whereby the emitter 89 of the transistor goes more positive. The increased positive potential appearing on the emitter 89 is coupled to the input of the D.C. restorer circuit 49 as one side of the differentially integrated signal developed in response to the "switch" signal 37. The positive potential appearing at the emitter 79 of the transistor Q3 is an amplified level of the negative potential appearing at the terminal 47' and is also representative of the negative portion of the integrated output signal of the integrator 46 with the capacitor 96 and the resistor 71 establishing the positive portion of the differential integral.

As noted, a positive potential appears simultaneously at the input terminal 48' which is coupled through the resistor 74 to the base 73 of the transistor Q2. However, the base 73 of the transistor Q2 is at zero potential level and should desirably remain at this potential level. The presence of the positive potential on the base 73 of the transistor Q2 attempts to cause the transistor to conduct more, and the transistor Q1 to conduct less, whereby the base 86 of the transistor Q4 goes toward a more negative potential thereby decreasing the conduction of Q4.

When Q4 decreases in conduction, some of the current drawn from the negative power source V— through the resistor 83 charges the capacitor 98 further in a negative direction through the resistor 74 and toward the positive potential appearing at the terminal 48'. The potential appearing at the emitter 81 of the transistor Q4 is an integrated level of the positive potential appearing at the terminal 48' and is also representative of the positive portion of the integrated output signal of the integrator 46 with the capacitor 98 and the resistor 74 establishing the positive portion of the differential integral.

When the capacitor 98 charges, the positive potential is coupled to the base 97 of the transistor Q6 to cause the transistor to conduct additionally whereby the emitter 91 goes to a higher positive level. The potential appearing on the emitter 91 of the transistor Q6 is coupled to the D.C. restorer circuit 49 as the positive portion of the differentially integrated signal developed in response to the "switch" signal.

The "shuttle" and "coercive" signals 38 and 43 (FIG. 2) are integrated differentially in the same manner. It is noted that integration and amplification of the signals 37, 38 and 43, which are of extremely low amplitude and short duration, are accomplished simultaneously and noise and common mode signals are rejected. If the signals 37, 38 and 43 had been amplified and then integrated, the noise would have been amplified and the large range of amplitudes and short duration signals would be very difficult to process.

As noted, when each of the signals 37, 38 and 43 (FIG. 2) are integrated, the integrated signals accumulate where the second integrated signal is developed on a base reference line coincident with the upper potential level 45b (FIG. 5) of the first integrated signal and the third integrated signal is developed from a base reference line coincident with the upper potential level 45d (FIG. 5) of the second integrated signal. The measuring of the integrated signals would be difficult to accomplish if each integrated signal has a different base reference potential. Therefore, the D.C. restorer circuit 49 is designed to reference logically all integrated signals to the same base potential such as zero potential or ground but not necessarily limited to either. In this manner subsequent circuits can measure each integrated signal with respect to the same base potential reference.

Referring further to FIG. 5, the D.C. restorer circuit 49 includes a pair of input coupling capacitors 101 and 102 which are of low capacitive value and facilitate the coupling of the differentially integrated signals which appear between the emitters 89 and 91 of the transistors Q5 and Q6 respectively. The capacitors 101 and 102 are connected to electrolytic capacitors 103 and 104, respectively, which have larger capacitive values for coupling the integrated signals to a pair of high-input, low-output impedance circuits, designated generally by the numerals 106 and 107, respectively.

The output circuit 106 of the D.C. restorer circuit 49 includes a pair of transistors, designated generally by the expressions Q7 and Q8, and a resistor 108. A pair of resistors 109 and 111, which are connected between the negative power source V— and the positive power source V+, provide a bias network for the output circuit 106 and normally bias the transistors Q7 and Q8 into conduction. A resistor 112 and a capacitor 113 forms a filter for eliminating noise signals which may be developed in the positive power source V+. A filter, designated generally by the reference numeral 114, eliminates noise signals which may be developed in the negative power source V—.

The output circuit 107 of the D.C. restorer circuit 49 includes a pair of transistors, designated generally by the reference expressions Q9 and Q10, and a resistor 116. A pair of resistors 117 and 118 provide a bias network for the output circuit 107 and are connected between the positive power source V+ and the negative power source V—. The values of the resistors 117 and 118 are selected so that the transistors Q9 and Q10 of the output circuit 107 are normally conducting.

The D.C. restorer circuit 49 is designed to couple logically each integral signal from the output of the integrator 46 to the output circuits 106 and 107 of the restorer circuit during periods when each of the "switch," "shuttle" and "coercive" signals 37, 38 and 43, respectively, are being coupled to the integrator. During all other periods the D.C. restorer circuit 49 passes all signals, which appear after the integrator 46, to ground. Therefore, each integrated signal is referenced to the same base reference potential which is established by the D.C. restorer circuit 49.

A pair of logic transistors, designated generally by the reference designations Q11 and Q12, are controlled by a negative logic pulse 119 which is coupled logically at selected periods to the D.C. restorer circuit 49 to control the biasing applied to a base 121 of the transistor Q11. The periods for applying the pulse 119 to the D.C. restorer circuit 49 are selected to coincide with the periods when the ferrite core 21 (FIG. 1) is pulsed to produce the "switch," "shuttle" and "coercive" signals 37, 38 and 43, respectively.

Referring further to FIG. 6, a diode 122 is included in a circuit which also includes the negative power source V—, the filter 114, a resistor 123 and ground and establishes a constant negative potential level at emitters 124 and 126 of transistors Q11 and Q12 respectively. Collectors 127 and 128 of the transistors Q11 and Q12, respectively, are connected to the positive power source V+ through resistors 129 and 131, respectively. In addition, the collector 127 of the transistor Q11 is connected to a base 130 of the transistor Q12.

A pair of transistors Q13 and Q14, which are controlled by the logic transistors Q11 and Q12, have bases 132 and 133 which are connected through resistors 134 and 136, respectively, to the collector 128 of the transistor Q12. The resistor 136 is variable to establish initiallly a symmetrical, balanced arrangement between the parameters of the circuit which includes the transistors Q13 and Q14. Collectors 137 and 138 of the transistors Q13 and Q14, respectively, are connected to ground and in such a manner that the collectors function as emitters with respect to the associated bases and require the same type of operating bias in the base-collector circuit as would be required normally in the base-emitter circuit to operate the associated transistors. An emitter 139 of the transistors Q13 is connected to a junction 141 located between capacitors 101 and 103 and an emitter 142 of the transistor Q14 is connected to a junction 143 located between the capacitors 102 and 104.

The negative logic pulse 119 is applied to the D.C. restorer circuit 49 at a terminal 144 and through a diode 146 and draws current through a resistor 147 to bypass the base 121 of the transistor Q11. In this manner, the transistor Q11 is not conducting.

When the transistor Q11 is not conducting, the base 130 of the transistor Q12 draws current through the resistor 129 and the transistor Q12 is conducting. When the transistor Q12 is conducting, the permanent negative potential developed across the diode 122 is coupled to the bases 132 and 133 of the transistors Q13 and Q14. Since the collectors 137 and 138 of the transistors Q13 and Q14, respectively, are at ground, the transistors will not conduct. Therefore, any differential signal, which is fed into the low value capacitors 101 and 102 from the integrator 46, is coupled to the capacitors 103 and 104, respectively, and subsequently to the output circuits 106 and 107, respectively.

When the negative logic pulse 119 goes to a zero potential level, the diode 146 is reverse-biased to permit the base 121 of the transistor Q11 to draw current so that the transistor is conducting. When the transistor Q11 is conducting, the negative potential appearing across the diode 122 is coupled to the base 130 of the transistor Q12 to prevent the transistor Q12 from conducting. When the transistor Q12 is not conducting, the bases 132 and 133 of the transistors Q13 and Q14, respectively, will draw current so that the transistors Q13 and Q14 will be conducting. Any signals which are now coupled through the capacitors 101 and 102 from the integrator 46 will be shorted across the conducting emitter-collector circuits of the transistors Q13 and Q14. Thus any unwanted signals are prevented from being coupled to other circuits of the system 44 and the desired signals are all based at the same reference level for subsequent measuring.

More specifically, when the transistors Q13 and Q14 are conducting, ground is coupled through the emitter-collector circuits of the transistors to one side of the capacitors 101 and 102. Since the other sides of the capacitors 101 and 102 are connected to the output side of the integrator 46, the capacitors will charge to some value with ground, or any selected potential level which appears at the collectors 137 and 138, appearing on the side of the capacitors connected to the emitters 139 and 148 of the transistors Q13 and Q14, respectively.

When the transistors Q13 and Q14 are biased non-conducting, ground, or any selected potential level which is applied instead of ground, is removed from the capacitors 101 and 102. However, since there is no change in voltage appearing at the output of the integrator 46, the capacitors 101 and 102 will not discharge but will maintain at ground on the sides of the capacitors which are connected to the emitters 139 and 142, respectively. Subsequently, any signal which is integrated by the integrator 46, such as the "switch" signal 37, will be coupled to the D.C. restorer circuit 49 through the capacitors 101 and 102 and will appear at the output of the D.C. restorer circuit at the base reference potential level which appears on the sides of the capacitors 101 and 102 which are connected to the emitters 139 and 142, respectively. As previously noted, the potential appearing on the sides of the capacitors 101 and 102 which are connected to the emitters 139 and 142, respectively, is essentially at ground. Therefore, the output of the D.C. restorer circuit 49 will be referenced essentially at ground. However, other potential levels could be selected as the reference level for the D.C. restorer circuit 49 instead of ground.

When the "shuttle" signal 38 is fed to the integrator 46, the signal is integrated and appears at the output of the integrator. As previously noted, the output of the integrator 46 is accumulative and the portion of the integrated output 45 (FIG. 5) which was derived from the "shuttle" signal 38 is represented by the slope 45c which rises to the steady D.C. level 45d. The actual amplitude of the portion of the integrated output 45 which relates to the "shuttle" signal 38 is measured between a base reference line 45j and the D.C. level 45d. However, the absolute amplitude of the integrated output represented by the slope 45c is equal to the difference between the steady level 45d and the steady level 45b.

Since the sides of the capacitors 101 and 102 which are connected to the emitters 139 and 142, respectively, are essentially at ground, the additional charge of potential in the integrator 46 due to the "shuttle" signal 38 (FIG. 5) and represented by the slope 45c (FIG. 5) is coupled through the capacitors 101 and 102 and appears at the output of the D.C. restorer circuit 49 with a base reference potential level being substantially at ground. Thus, the "switch" and "shuttle" signals 38 and 39 and the "coercive" signal 43 appear at the output of the D.C. restorer circuit 49 with a common base reference potential level essentially at ground.

When the logic pulse 119 goes to the negative potential, a capacitor 148 is charged through a resistor 149 to a negative potential which is the difference between the negative potential developed by the diode 122 and the negative potential of the logic pulse 119 and retains this negative charge as long as the logic pulse 119 is at the negative potential. When the logic pulse 119 returns to the zero potential level, the negative charge on the capacitor 148 maintains the transistor Q11 in the non-conducting state. However, the capacitor 148 starts to discharge and subsequently reaches a potential level at which the transistor Q11 starts to conduct which occurs at a fixed time after termination of the logic pulse 119. As the transistor Q11 starts to conduct, the collector 128 of the transistor Q12 approaches a more positive potential which is then coupled through the capacitor 148 to provide negative feedback to turn on quickly the transistor Q11. The use of the capacitor 148 in this manner facilitates the maintaining of the D.C. restorer circuit 49 in a restore mode for a period slightly longer than the duration of the negative portion of the logic pulse 119 which also starts the fall time of the current pulses 27b, 27c and 27d (FIG. 2). In this manner, the logic pulse 119 compensates for the trailing portions of the current pulses 27a, 27b and 27d which occur briefly after the duration of the negative portion of the logic pulse. The capacitor 148, when used in this manner, also provides a short initial delay and rapid switching of the circuit after the delay has terminated.

Referring to FIG. 7, the differential amplifier 51 includes a constant current circuit, designated generally by the numeral 151, having a Zener diode 152 connected between the positive power source V+ and the negative power source V— to establish a voltage level for the circuit. The voltage level established by the Zener diode 152 is coupled through a noise filter, designated generally by the numeral 153, to a current amplifying circuit including two transistors, designated generally by the expressions Q15 and Q16, and a resistor 154 which provides a high output impedance.

The constant current is supplied to emitters 156 and 157 of a pair of balanced, differentially arranged transistors, designated generally by the expressions Q17 and Q18, respectively.

The emitter of the transistor Q8 (FIG. 5) is connected to an electrolytic capacitor 158 which is connected to a resistor 159. The resistor 159 is connected to a base 161 of the transistor Q17 and also to ground through a resistor 162. A collector 163 of the transistor Q17 is connected to the positive power source V+ through a noise filter, designated generally by the numeral 164.

The emitter of Q10 (FIG. 5) is connected to an electrolytic capacitor 166 which is connected to a resistor 167. The resistor 167 is connected to a base 168 of the transistor Q18 and is also connected to one side of a resistor 169. A collector 171 of the transistor Q18 is connected to a base 172 of an emitter-follower transistor, designated generally by the expression Q19, and to one side of a resistor 173. The other side of the resistor 173 and a collector 174 of the transistor Q19 are connected to the positive power source V+ through the filter 164. A diode 176 is connected at one side thereof to an emitter 177 of the transistor Q19 and at the other side thereof to the other side of the resistor 169 and to one end of a load resistor 178. The other side of the resistor 178 is connected to the negative power source V—. The single output from the differential amplifier is taken from the circuit of the emitter-follower transistor Q19 as current flow either from the load resistor 178 or the emitter-collector circuit of the transistor.

Ideally, there should be no potential difference between the base 161 of the transistor Q17 and the base 168 of the transistor Q18. Therefore, the current supplied by the source 151 will divide equally and flow through the emitter-collector circuits of the transistors Q17 and Q18 to establish a potential drop across the resistor 173 which is normally sufficient to bias the transistor Q19 into conduction. The diode 176 establishes a positive bias level for the transistor Q19 wherein the bias potential for the base 172 of the transistor must exceed the bias potential established by the diode before the transistor will conduct. Thus, since the base potential of the transistor Q18 is normally at zero level, the diode 176 establishes a bias level more positive than zero level for the emitter 177 of the transistor Q19.

If noise and common mode signals are developed in the integrator circuit 46 and the D.C. restorer circuit 49 and are coupled to the differential amplifier 51, the amplitude and polarity of the signals appearing at the input capacitors 158 and 166 will be the same and will be coupled to the bases 161 and 168 of the transistors Q17 and Q18, respectively. Since no difference of potential is developed between the bases 161 and 168, the transistors Q17 and Q18 remain balanced and the current supplied by the source 151 still divides evenly between the emitter-collector circuits of the two transistors Q17 and Q18. Therefore, there is no change in the current flow through the resistor 173 and the bias on the base 172 remains unchanged and the conduction level of the emitter follower transistor Q19 remains unchanged. Thus all noise and common mode signals are eliminated at the differential amplifier 51.

The input capacitors 158 and 166 are electrolytic and of large capacitive value to facilitate the elimination of any D.C. component of the signals being fed to the differential amplifier 51. However, the D.C. restorer circuit 49 has developed short pulses having the same base reference which represent the integrated signal output of the integrator 46. It is noted that the integrated input signals of the D.C. restorer circuit 49 were stepped D.C. levels. Therefore, the signals to be measured now appear as pulses and are passed by the input capacitors 158 and 166 to the differential amplifier 51.

When one of the differentially integrated signals is coupled through the D.C. restorer circuit 49, the integrated signal appears as an input to the differential amplifier 51 at the capacitors 158 and 166 thereby tending to establish a difference of potential between the bases 161 and 168 of the transistors Q17 and Q18. Assuming that the potential appearing at the base 168 tends to go more positive, the transistor Q18 tends to conduct more which couples an amplified current level to the base 172 of the transistor Q19 to cause the transistor Q19 to decrease in the level of conduction.

With less current drawn through the emitter-collector circuit of the transistor Q19, the current through the feedback resistor 169 is in such a direction and level to establish a condition wherein the base 168 of the transistor Q18 tends to stabilizer with no potential differential between the base 168 and the base 161 of the transistor Q17. Thus the balanced condition between the transistors Q17 and Q18 is maintained. However, a portion of the current drawn from the negative power source through the load resistor 178 is now available for the output load of the differential amplifier 51 since the current demand by the transistor Q19 has been decreased. The current level available to the single output load of the differential amplifier 51 is in direct relation to each of the differential signals which are applied to the amplifier.

Referring further to FIG. 7, the operational amplifiers 52 and 53 are identical in circuit structure and differ only in circuit parameters to the extent that higher amplification is obtained in the amplifier 53. Therefore, the amplifiers 52 and 53 will be described in terms of the circuit configuration of the amplifier 52.

The amplifier 52 includes a capacitor 179 having a high capacitive value to facilitate the decoupling of any D.C. components in the input signals and to couple the A.C. component into the amplifier. The capacitor 179 is connected to an input resistor 181 which, in turn, is connected to a dual diode, deisgnted generally by the numeral 182, which is in parallel with a capacitor 183. The dual diode 182 and the capacitor 183 are connected to a base 184 of an amplifier transistor, designated generally by the expression G20. A collector 186 of the transistor Q20 is connected to the positive voltage source V+ through resistors 187 and 188 and is also connected to a base 189 of an emitter-follower transistor, designated generally by the expression Q21, which is of the PNP type. An emitter 191 of the transistor Q20 is connected to ground.

An emitter 192 of the transistor Q21 is connected to one side of a variable feedback resistor 193 which can be varied to establish the gain of the system 44. The emitter 192 is also connected to the positive power source V+ through a resistor 194 and to one side of a coupling capacitor 196. A collector 197 of the transistor Q21 is connected to ground. A coil 198 is connected between ground and the other side of the capacitor 196 to provide a low D.C. resistance load and a high impedance load for signals. The output of the amplifier 52 is taken across the load coil 197 which establishes a true ground reference for the output signals.

The base 184 of the transistor Q20 will be maintained at zero potential level. Normally, the transistor Q20 is conducting which develops sufficient bias to cause Q21 to conduct.

Since the transistor Q21 is conducting, a positive potential will appear at the emitter 192 of the transistor which is fed back through the variable resistor 193 to a junction point 199 between the input resistor 181 and the dual diodes 182 to establish substantially a zero voltage potential. When the positive potential appears at the emitter 192 of the transistor Q21, the coupling capacitor 196 charges toward a positive potential.

When one of the signals 50a and 50c is coupled to the operational amplifier 52, the transistor Q20 is biased to control the conduction of the transmitter Q21 so that the potential appearing at the emitter 192 changes in response to the input to the operational amplifier 52. The change in potential appearing at the emitter 192 of the transistor Q21 is fed back through the variable resistor 193 to the point 199 to maintain the point at substantially zero volts. In addition, the capacitor 196 is charged additionally to develop a current which is coupled to the discriminators 54 and 56.

The discriminators 54, 56 and 57 are similar in circuit configuration. Therefore, for the purposes of explanation, only the circuit configuration of the discriminator 56 will be discussed. The discriminator 56 includes a constant current power source 201 which is connected to emitters 202 and 203 of a pair of transistors, designated generally by the expressions Q22 and Q23, respectively. A steady state reference voltage source 204 is connected to a base 206 of the transistor Q23. The output of the operational integrator 52 is connected to a base 207 of the transistor Q22. A collector 208 of the transistor Q23 is connected to the positive potential V+ and a collector 209 of the transistor Q22 is connected to the positive potential V+ through a resistor 211. In addition, the collector 209 of the transistor Q22 is connected to a "set" input of a "flip-flop" 212.

An enabling pulse source 213 is connected to a base 214 of a transistor, designated generally by the expression Q24, through a resistor 216. An emitter 217 of the transistor Q24 is connected to ground and a collector 218 of the transistor is connected to the "set" input of the "flip-flop" 212. The output of the "flip-flop" 212 is connected to a coil 219 of a relay having a normally open contact 219a which is connectable in a circuit which includes an indicator lamp 221 for indicating the rejection of the ferrite core 21 (FIG. 1) being tested in terms of the core characteristics being measured in terms of the "switch" signal 37 (FIG. 2). It is noted that the circuit including the lamp 221 could include facilities for dispensing the ferrite core 21 being tested in response to the test results. It is further noted that the discriminators 54 and 57 are similar in circuit configuration and are provided with similar test result indicators for indicating the acceptance or rejection of the ferrite core 21 in response to the "coercive" and "shuttle" signals 43 and 37, respectively.

The reference voltage source 204 applies normally a potential to the base 206 of the transistor Q23 which conditions the circuit including the circuits Q22 and Q23 so that all of the current provided by the constant current source 201 flows in the emitter-collector circuit of the transistor Q23 when no input signal is applied to the base 207 of the transistor Q22. Therefore, the collector 209 of the transistor Q22 would be at a positive potential which would be coupled to the "flip-flop" 212 to set the "flip-flop." However, the enable pulse source 213 couples normally a positive potential to the base 214 of the transistor Q24 so that the transistor is conducting and the collector 218 of the transistor is at ground. Since the collector 218 of the transistor Q24 is at ground, the "set" input of the "flip-flop" 212 is at ground and the "flip-flop" is not set.

Assuming that the differentially amplified, integrated pulse 50a (FIG. 5) is applied to the operational amplifier 52, the output of the operational amplifier is substantially the same in wave form and is coupled to the base 207 of the transistor Q22. If the positive potential of the input appearing on the base 207 of the transistor Q22 is higher than the potential applied to the base 206 of the transistor Q23 by the reference voltage source 204, the transistor Q22 will conduct whereby the collector 209 goes to a less positive potential which is coupled to the "set" input of the "flip-flop" 212. Since a high positive potential is required to set the "flip-flop" 212, the low positive potential resulting from the conduction of the transistor Q22 is insufficient to set the "flip-flop." However, the transistor Q24 remains conducting and also provides ground to the "set" input of the "flip-flop" 212 to prevent the "flip-flop" from being set.

Subsequently, the enable pulse source 213 goes to a negative level as indicated by the pulse 55a (FIG. 5) which turns off the transistor Q24 and removes the ground which was applied to the "set" input of the "flip-flop" 212. Since the output of the operational amplifier 52 has not exceeded the positive potential appearing on the base 206 of the transistor Q23, the transistor Q22 would not be conducting and the collector 209 would appear at a high positive potential which would be sufficient to set the "flip-flop" 212 so that operating potential is applied to the coil 219 and the contact 219a is closed to operate the rejection indicator 221.

Desirably, the amplitude of the output of the operational amplifier 52 should be more positive than the potential appearing at the base 206 of the transistor Q23 whereby the collector 209 of the transistor Q22 would appear at some low positive potential when the transistor Q24 was turned off and the low positive potential would prevent the setting of the "flip-flop" 212 to thereby indicate the acceptance of the ferrite core 21 (FIG. 1) with respect to the characteristics measured in terms of the "switch" signal 37 (FIG. 2). Thus, the discriminator 56 detects whether the amplitude of the integrated pulse 50a exceeds or is less than the reference potential supplied by the source 204 and provides an indication as to the acceptability of the amplitude of the pulse and further to the acceptability of the ferrite core 21 (FIG. 1) in terms of the "switch" signal 37 (FIG. 2). The "flip-flop" 212 is provided with a "reset" input for resetting the "flip-flop" after the "flip-flop" has been set.

The integrated signal 50b (FIG. 5) is coupled to the operational amplifier 53 and is amplified and coupled to the discriminator 57 and is measured by the discriminator to determine whether the ferrite core 21 (FIG. 1) is acceptable. The integrated signal 50c (FIG. 5) is coupled from the operational amplifier 52 to the discriminator 54 to determine whether the ferrite core 21 (FIG. 1) is acceptatble in terms of the coercive characteristics of the core.

It is to be understood that the above-described arrangements are simply illustrative of the invention. Other arrangements may be devised by those skilled in the art which will embody the principles of the invention and fall within the spirit and scope thereof.

What is claimed is:

1. A system for measuring signals, which comprises:
means for integrating at least one signal to be measured;
the means for integrating having an input to receive the signal to be measured and an output whereat an integrated signal which is proportional to the integral of the signal to be measured appears;
means for generating a reference level to which the integrated signal is to be restored prior to being measured so that the amplitude of the integrated signal can be measured with respect to the reference level;
the means for generating having an input for receiving the integrated signal appearing at the output of the means for integrating;
means connecting the output of the means for integrating to the input of the means for generating;
output means included in the means for generating connected to the input of the means for generating for developing output signals in response to signals applied to the input of the means for generating;
means for preventing signals which appear at the input of the means for generating from appearing at the output means of the means for generating;
the means for preventing connected to the input and the output means of the means for generating and being the source of the generated reference level;
means for controlling the means for preventing to permit signals appearing at the input of the means for generating to appear at the output means of the means for generating during a period when the signal to be measured is being applied to the means for integrating and for applying the reference level to the input of the means for generating and thereby preventing signals appearing at the input of the means for generating from appearing at the output means of the means for generating at all other times so that when the signal to be measured appears at the input of the means for integrating, the integrated signal appears at the output means of the means for generating and can be measured with respect to the generated reference level, and means for measuring the integrated output signal.

2. The system as set forth in claim 1 wherein the means for preventing includes:
   a pair of NPN transistors having collectors connected together and to said reference level, the emitters of the transistors connected between the input and the output means of the means for generating, the bases of the transistors being biased commonly, the means for controlling connected to said transistors and being arranged to bias the transistors into conduction or nonconduction so that, when the signal to be measured is appearing at the input of the means for integrating, the means for controlling biases the transistors to a non-conductive state whereby the integrated signal appearing at the input of the means for generating is fed to and appears at the output means and, at all other times, the means for controlling biases the transistors to a conductive state to short all signals appearing at the input of the means for generating to said reference level.

3. The system as set forth in claim 1 wherein the means for controlling includes:
   a gating circuit which biases into operation the means for preventing so that unwanted signals are absent from the output means of the means for generating the reference level, and
   means for biasing the gating circuit selectively to permit the integrated signal derived from the signal to be measured to appear in the output means of the means for generating the reference level.

4. A system for measuring signals, which comprises:
   a differential operational integrating amplifier having an input impedance and an output impedance, the amplifier being responsive only to differences in potential appearing across the input impedance and developed by the signals to be measured so that only the signals to be measured are integrated and appear across the output impedance of the amplifier;
   a pair of NPN transistors having collectors connected together and to a reference level, the emitters of the pair of transistors connected across the output impedance of the amplifier so that the emitter-collector circuits of the transistors are connected in series, the bases of the transistors being biased commonly;
   a pair of coupling capacitors, each coupling capacitor connected serially between one side of the output impedance of the integrating amplifier and one of the emitters of the pair of transistors so that the series-connected, emitter-collector circuits of the pair of transistors are connected through the pair of capacitors across the output impedance of the integrating amplifier;
   means connected to the junctions of the coupling capacitors and the emitters for measuring the amplitude of the integrated signals, and
   gating means connected to the bases of the transistors for applying bias potential to the bases to control selectively the operating of the transistors so that, when the signals to be measured appear at the input of the integrating amplifier, the gating means biases the transistors into a nonconductive state and the integrated signals are coupled from the output impedance of the integrating amplifier through the coupling capacitors to the means for measuring the amplitude of the integrated signals, and so that, at times other than when the signals to be measured appear at the input to the integrating amplifier, the gating means biases the transistors into a conductive state and any signals appearing at the output impedance of the integrating amplifier are coupled through the coupling capacitors, through the emitter-collector circuits of the conducting transistors and to said reference level.

References Cited

UNITED STATES PATENTS

| | | | |
|---|---|---|---|
| 3,248,570 | 4/1966 | Gaunt | 307—235 |
| 3,305,729 | 2/1967 | Stein | 307—235 |
| 3,309,538 | 3/1967 | Ashley et al. | 307—235 |
| 3,419,784 | 12/1968 | Winn | 328—127 |

OTHER REFERENCES

Center et al.: Core Characteristic Indicator; IBM Tech. Disclosure Bulletin; vol. 2, No. 4, December 1959, p. 139.

Benson et al.: Integrating Amplifier With AC Common Mode Noise Rejection; IBM Tech. Disclosure Bulletin, vol. 10, No. 8, January 1968, pp. 1150–1151.

RUDOLPH V. ROLINEC, Primary Examiner

R. J. CORCORAN, Assistant Examiner

U.S. Cl. X.R.

324—34, 120; 328—115, 127